United States Patent
Riguer et al.

(10) Patent No.: US 12,524,950 B2
(45) Date of Patent: Jan. 13, 2026

(54) SYSTEM AND METHOD FOR ADJUSTING FILTERING FOR TEXTURE STREAMING

(71) Applicants: Advanced Micro Devices, Inc., Santa Clara, CA (US); ATI Technologies ULC, Markham (CA)

(72) Inventors: Guennadi Riguer, Markham (CA); Michal Adam Woźniak, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 188 days.

(21) Appl. No.: 18/345,427

(22) Filed: Jun. 30, 2023

(65) Prior Publication Data

US 2025/0005840 A1   Jan. 2, 2025

(51) Int. Cl.
*G06T 15/04* (2011.01)
*G06T 3/4007* (2024.01)

(52) U.S. Cl.
CPC ............ *G06T 15/04* (2013.01); *G06T 3/4007* (2013.01); *G06T 2210/36* (2013.01)

(58) Field of Classification Search
CPC .... G06T 15/04; G06T 3/4007; G06T 2210/36
USPC ........................................................ 345/418
See application file for complete search history.

(56) References Cited

U.S. PATENT DOCUMENTS

| | | | | |
|---|---|---|---|---|
| 6,995,767 B1 * | 2/2006 | Donovan | ................. | G06T 15/04 345/428 |
| 7,372,467 B1 * | 5/2008 | Toksvig | .................. | G06T 15/04 345/611 |
| 7,372,468 B1 * | 5/2008 | Toksvig | .................. | G06T 15/04 345/611 |
| 7,944,453 B1 * | 5/2011 | Newhall, Jr. | ......... | G06T 11/001 345/428 |
| 2002/0089512 A1 * | 7/2002 | Slade | ...................... | G06T 15/04 345/582 |
| 2002/0126133 A1 * | 9/2002 | Ewins | ...................... | G06T 15/04 345/587 |

(Continued)

FOREIGN PATENT DOCUMENTS

WO   WO-2005004064 A1 *   1/2005   ............. G06T 15/04

OTHER PUBLICATIONS

Heckbert, P. S., "Fundamentals of Texture Mapping and Image Warping", Master's Thesis, Department of Electrical Engineering and Computer Science, University of California, Berkley, California, Jun. 17, 1989, 94 pgs.

*Primary Examiner* — Sheree N Brown
(74) *Attorney, Agent, or Firm* — Volpe Koenig

(57) ABSTRACT

A technique for texture filtering. A transition is made from a first mipmap corresponding to a first texture resolution to a second mipmap corresponding to a second texture resolution. The first texture resolution is lower than the second texture resolution. As compared to standard trilinear filtering, initiation of the transition is delayed by an offset (or bias), which serves to delay the initial use of the second mipmap until it has been loaded. Following initiation of the transition, first and second weightings are selected with a nonlinear filter, and the system interpolates between the first mipmap and the second mipmap by applying the weightings. During an initial portion of the transition, the nonlinear filter has a slope that is higher than that of the standard trilinear filter.

20 Claims, 8 Drawing Sheets

(56) References Cited

U.S. PATENT DOCUMENTS

2003/0030646 A1\* 2/2003 Yeh .................... G06T 15/04
345/582
2008/0303841 A1\* 12/2008 Newhall, Jr. .......... G06T 15/04
345/587

\* cited by examiner

SYSTEM AND METHOD FOR ADJUSTING FILTERING FOR TEXTURE STREAMING

BACKGROUND

Three-dimensional graphics processing involves rendering three-dimensional scenes by converting models specified in a three-dimensional coordinate system to pixel colors for an output image. Improvements to three-dimensional graphics processing are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for texture filtering is described. During graphics processing, a transition is made from a first mipmap corresponding to a first texture resolution to a second mipmap corresponding to a second texture resolution, wherein the first texture resolution is lower than the second texture resolution. As compared to standard trilinear filtering, initiation of the transition is delayed by an offset (or bias), which serves to delay the initial use of the second mipmap until it has been loaded. Following initiation of the transition, first and second weightings are selected with a nonlinear filter, and the system interpolates between the first mipmap and the second mipmap by applying the first weighting to texels from the first mipmap and the second weighting to texels from the second mipmap. During an initial portion of the transition, the nonlinear filter has a slope that is higher than that of the standard trilinear filter, which quickly brings the filtering weights to a blend value that is more similar to a result that would occur with no bias and with standard trilinear filtering.

Figure 1:
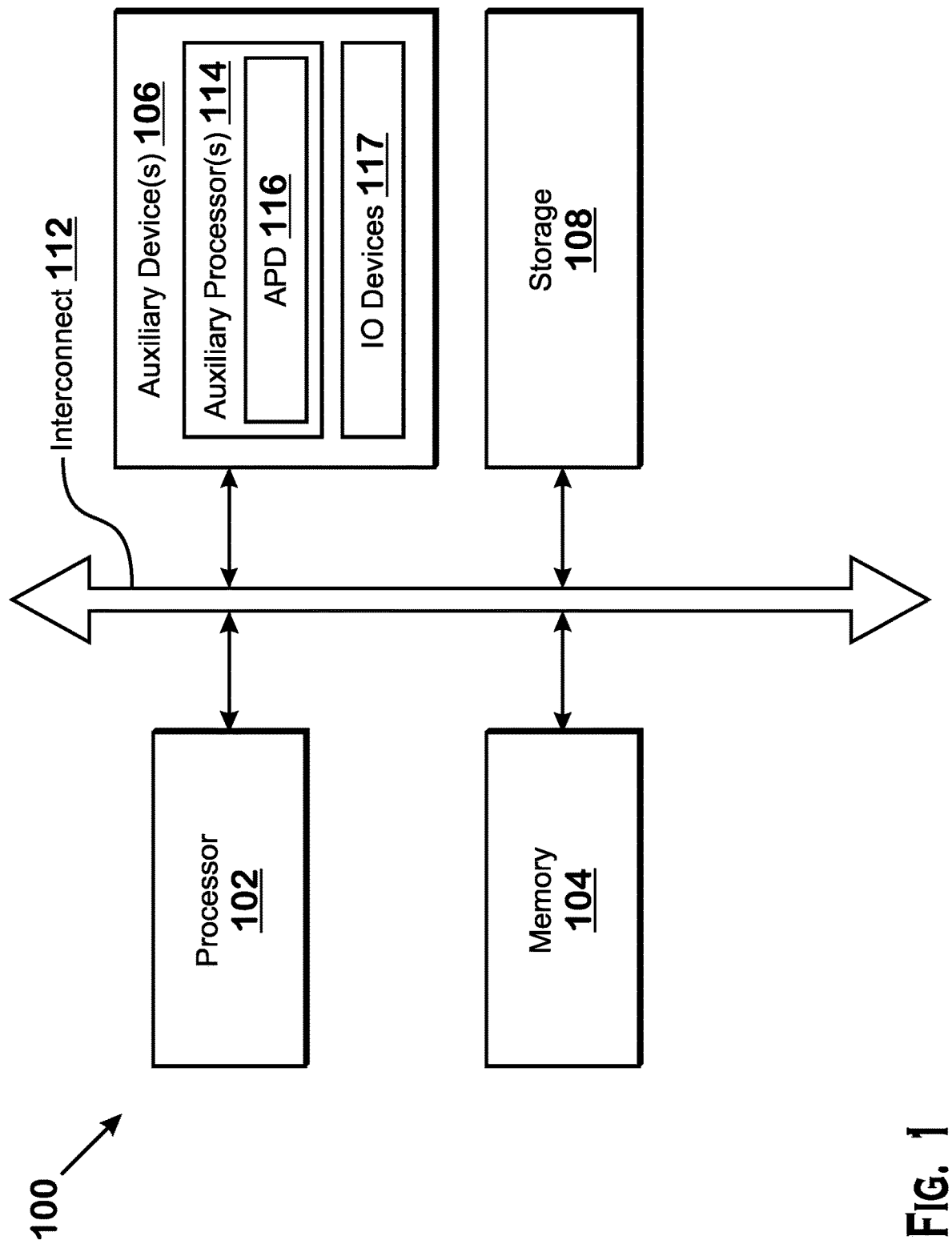
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid-state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
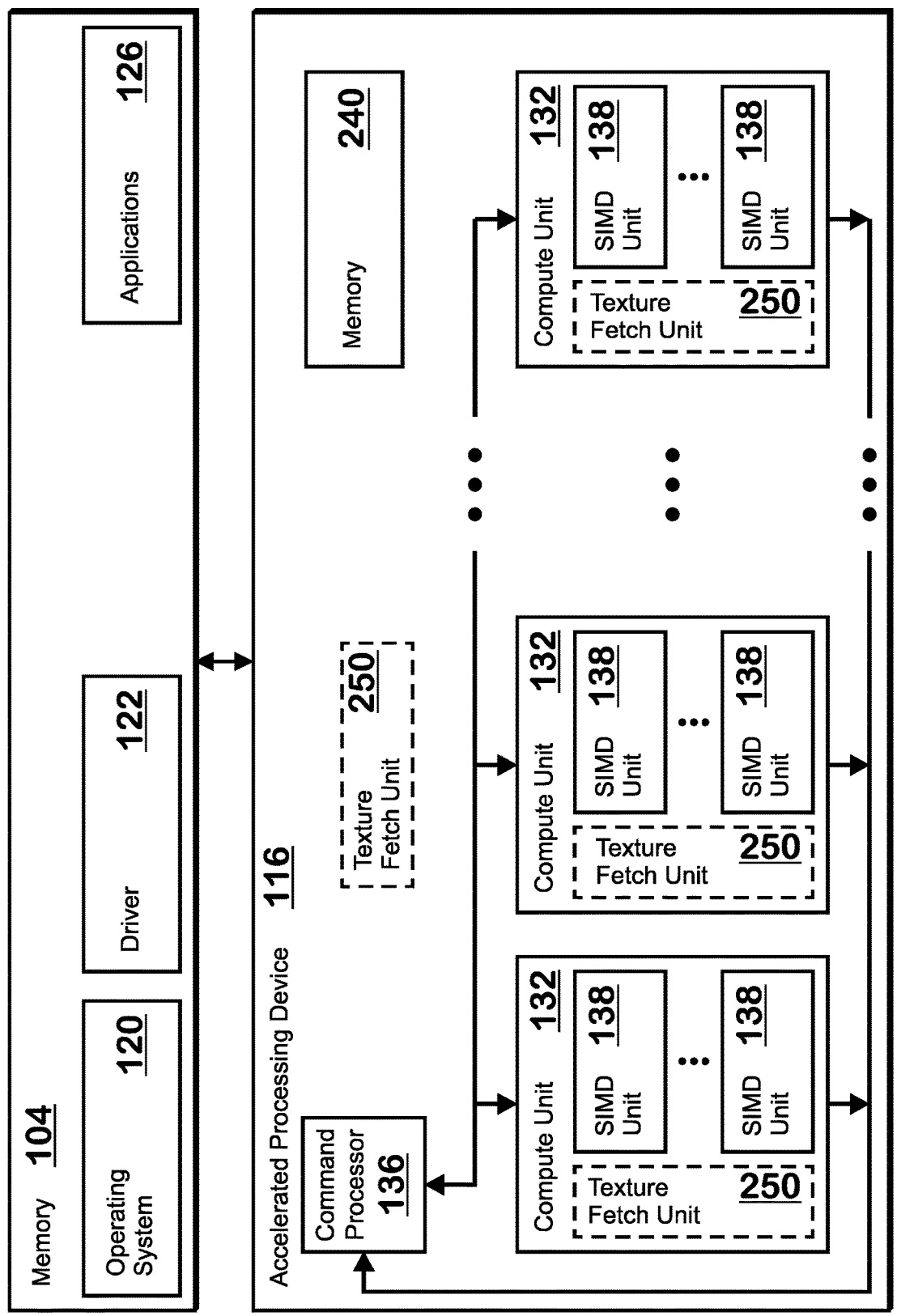
FIG. 2 illustrates details of the device of FIG. 1 and an accelerated processing device, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

A texture fetch unit 250 is present and is shown in several alternative forms. The texture fetch unit 250 is in various examples implemented as hardware circuitry (e.g., within the APD 116 or more particularly within one or more compute units 132), or as software executing on a processor (e.g., stored within APD memory 240). Although some locations for the texture fetch unit 250 are shown, the texture fetch unit 250 is, in various examples, located at any technically feasible location. In various examples, the texture fetch unit 250 is embodied as hardware (e.g., as circuitry configured to perform the operations described herein), as software (e.g., as instructions configured to execute on one or more processors, including one or more processors shown or described or not shown or described), as a combination of software and hardware, or in any other technically feasible manner. In some implementations where the texture fetch unit 250 is or includes hardware, the entirety or part of the texture fetch unit 250 is or includes a processor. In various examples, this processor is a fixed function processor, a programmable processor, a field programmable gate array or other form of programmable logic circuit, an application specific integrated circuit, or is implemented in any technically feasible manner.

Figure 3:
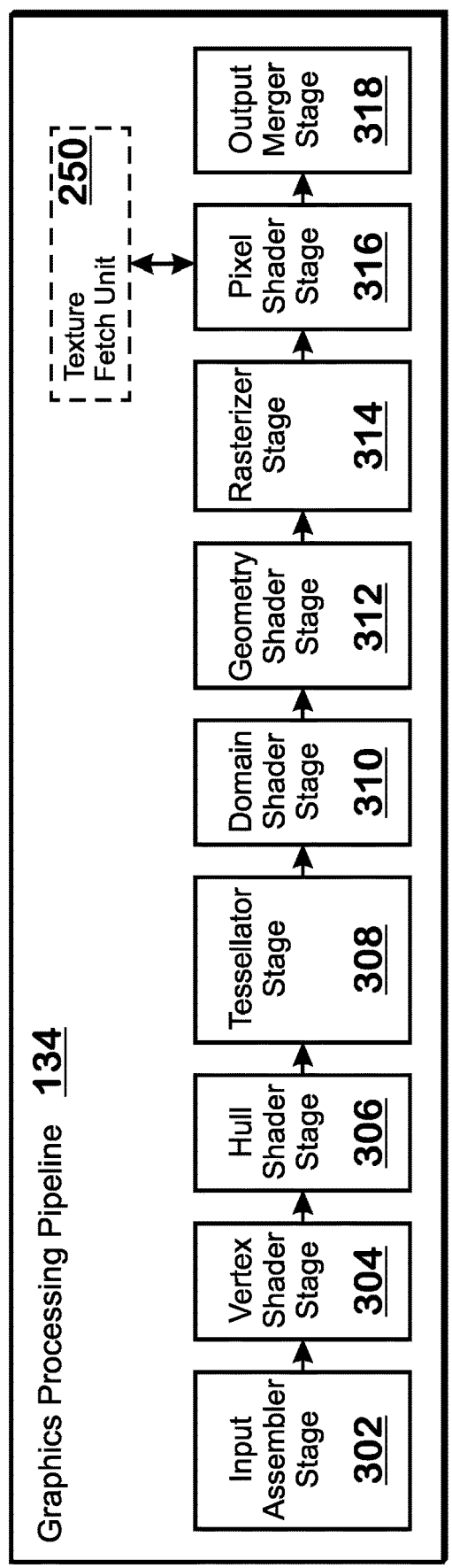
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132. In some examples, the pixel shader stage 316 interfaces with the texture fetch unit 250 to obtain sample values for shading fragments.

The output merger stage 318 accepts output from the pixel shader stage 316 and merges those outputs into a frame buffer, performing operations such as z-testing and alpha blending to determine the final color for the screen pixels.

Mipmapping is a computer graphics technique for improving rendering quality. Specifically, in some examples, textures are provided at multiple resolutions, each being a different mipmap level. Providing multiple such mipmap levels facilitates selection of an appropriate MIP level for a given rendering task, to avoid visual artifacts such as blurriness or those associated with oversampling (e.g., aliasing). When sampling a texture in order to shade a fragment, an appropriate MIP level or set of mipmap levels are selected and sampled from, and the sample or samples retrieved from the MIP level or MIP levels is used as the texture sample for the fragment.

Figure 4:
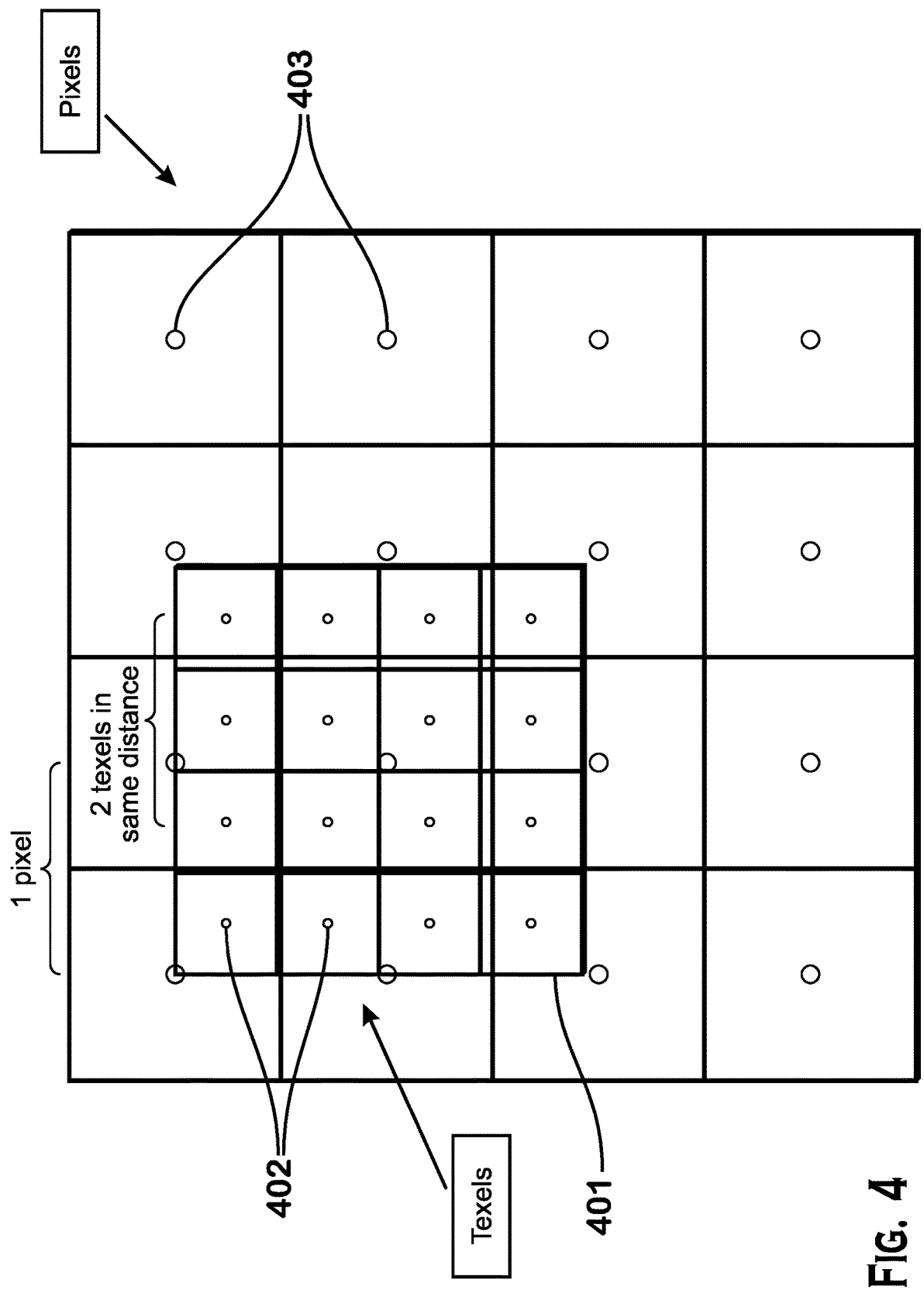
FIG. 4 illustrates a mipmap comprising texels superimposed upon screen pixels, in accordance with an example.

Referring to FIG. 4, an exemplary mipmap 401 comprising texels 402 is shown. In the figure, mipmap 401 is superimposed upon screen pixels 403, and there are four texels 402 for each screen pixel 403. In another example, texels 402 are not aligned to screen pixels 403. A texture of a particular MIP level is considered to match the screen resolution if the size of the pixels of the screen is similar to the size of the texels of that texture. Mipmap selection is done by based on a comparison between texel size and fragment size. More specifically, a level of detail is calculated based on this comparison. In some examples, the level of detail, which has an integer component and a fractional component, selects two mipmap levels that correspond to the integer components immediately greater than and immediately less than the level of detail.

During graphics processing, the rendering system transitions between various MIP levels. For example, as the level of detail changes from a first integer value to a second integer value, the filtering transitions from selecting mostly the MIP level corresponding to the first integer value to selecting mostly the MIP level corresponding to the second integer value. When standard trilinear filtering is used for such a transition, adjacent MIP levels are selected, where one has texels that are larger than or equal to the screen pixels and one has texels that are smaller than the screen pixels. A blend factor is determined based on the relative size of the screen pixels to the adjacent MIP levels. The blend factor is then used to determine the degree of interpolation between the MIP levels. A sample is generated by sampling each MIP level (e.g., using a bilinear filter), and the results of such sampling are combined using the blend factor.

In trilinear filtering, texture coordinate gradients are calculated. The texture coordinate gradient is representative of the distance between texture pixels in units of screen pixels in a particular direction, and describes the rate of change of the texture pixels when moving from one screen pixel to another. A level of detail (LOD) value is determined based on the gradients. In one example, a value p is calculated as the max of texture coordinate gradients (texel distance in the u direction, texel distance in the v direction relative to horizontal and vertical screen pixel spacing), where "texel distance" is the distance between screen pixels in a particular direction in units of texels of the largest texture MIP. Then the LOD is calculated as log base 2 of p plus a bias, with a clamp. Other methods of calculating the LOD can also be used.

Figure 5A:
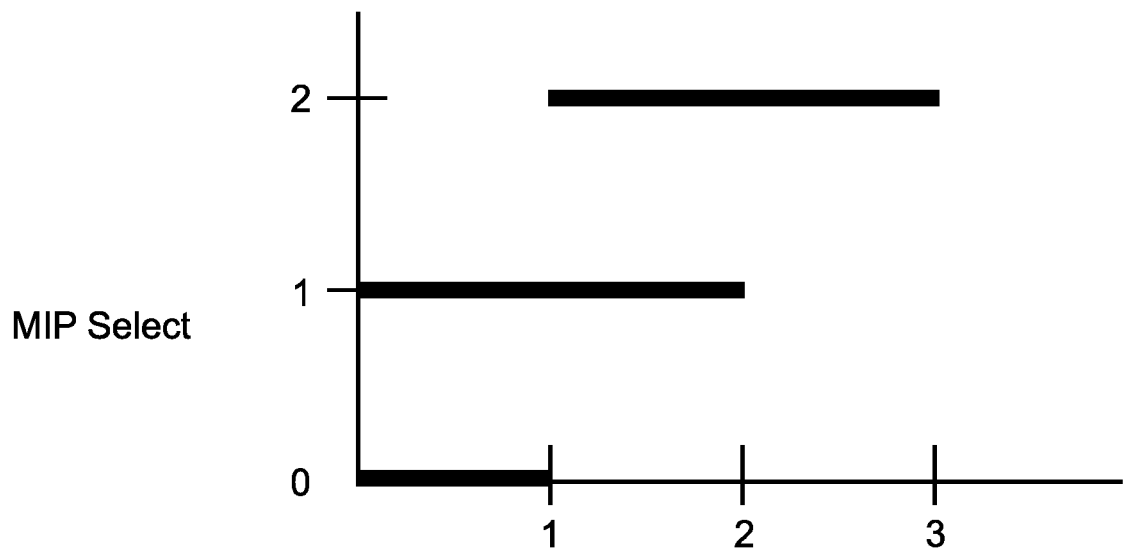
FIG. 5A illustrates a sequence for selecting mipmaps used with standard trilinear filtering.

FIG. 5A illustrates a sequence for selecting mipmaps used with trilinear filtering. The x-axis corresponds to the LOD value. The LOD value that selects MIP levels for interpolation as illustrated. More specifically, a particular LOD value selects two different MIP levels. For example, a LOD value between 0 and 1 selects MIP levels 0 and 1. Note that resolution increases as the MIP level approaches zero.

In addition to selecting MIP levels to use for the filter, FIG. 5A also illustrates when a texture filtering entity (e.g., the texture fetch unit 250) loads a particular MIP level into memory. Specifically, the LOD value indicates which two MIP levels are necessary for the filter. The texture filtering entity loads whichever of such MIP levels are not loaded into memory into the memory. It should be understood that loading a MIP level into memory means loading from some memory or storage that is not "immediately accessible" to the texture fetch unit 250 into a memory that is immediately accessible to the texture fetch unit 250. In some examples, this load loads from a higher-level cache, system memory, or a non-volatile memory into a low-level cache (e.g., level 0 cache), which is immediately accessible by the texture fetch unit 250. In other examples, this load loads from a network or a non-volatile memory to a volatile memory or cache. It can be observed that upon transitioning from one range of LOD levels to another range (e.g., when going from above LOD 1.0 to below LOD 1.0), the MIP level that is needed and that is thus loaded due to this transition is the next higher resolution MIP level as compared with the highest resolution MIP level that was most immediately used previously. For example, upon transitioning from LOD 1.1 to LOD 0.9, MIP level 0 is needed and is thus loaded.

Figure 5B:
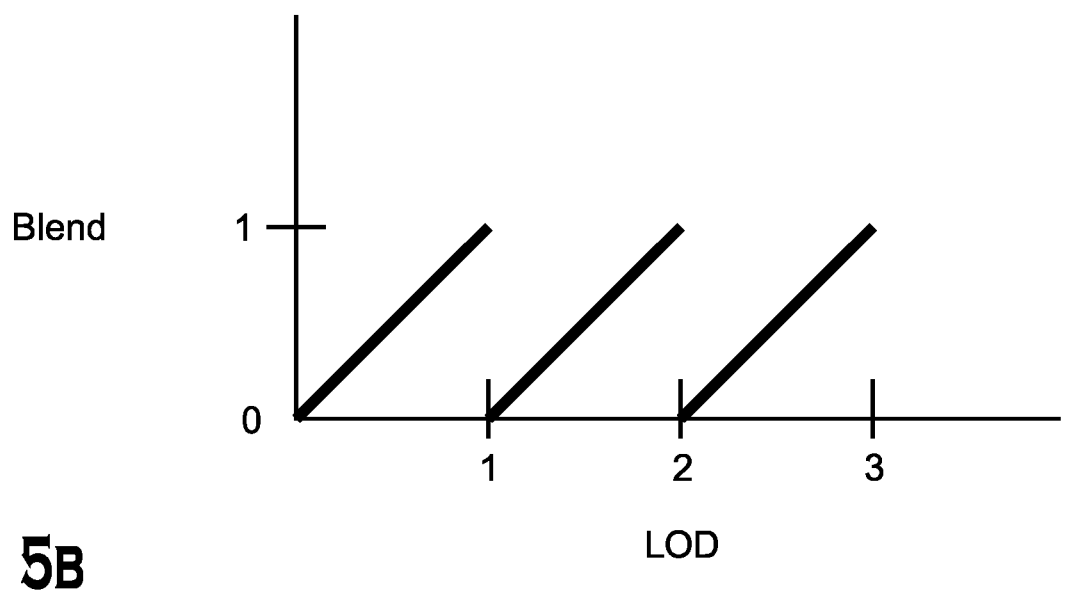
FIG. 5B illustrates the relationship between a blend factor and an LOD value in standard trilinear filtering.

FIG. 5B illustrates the linear relationship between the blend factor and the LOD in trilinear filtering. As shown in the figure, when the LOD is decreasing from 3 and reaches a value equal to 2, the system transitions from interpolating between MIP levels 2 and 3, to interpolating between MIP levels 1 and 2. As shown, when the LOD reaches 2, the blend factor jumps to 1, indicating that at that point, the relative contributions from MIP levels 1 and 2 are 0% and 100%, respectively. As the LOD continues to decrease toward 1, the relative contribution from MIP level 1 rises linearly, while the relative contribution from MIP level 2 decreases linearly. When the LOD decreases to 1, the blend factor decreases to 0, indicating that at that point, the relative contributions from MIP levels 1 and 2 are 100% and 0%, respectively. When the LOD reaches 1, the system transitions from interpolating between MIP levels 1 and 2, to interpolating between MIP levels 0 and 1, while the blend factor jumps to 1, indicating that at that point, the relative contributions from MIP levels 0 and 1 are now 0% and 100%, respectively. As the LOD continues to decrease toward 0, the relative contribution from MIP level 0 rises linearly, while the relative contribution from MIP level 1 decreases linearly. When the LOD decreases to 0, the blend factor decreases to 0, indicating that at that point, the relative contributions from MIP levels 0 and 1 are 100% and 0%, respectively.

Streaming large amounts of textures can be slow, resulting in blurrier images until the texture content is available. This problem can be exacerbated by the bursty nature of streaming. In trilinear texture filtering, once a higher resolution MIP level becomes available due to that MIP level being loaded, a noticeable "pop" is visible as rendering switches to a new higher-resolution texture. More specifically, because trilinear filtering interpolates between two MIP levels, when one such level is unavailable, the results of the filter appear blurrier until the higher resolution MIP level is loaded. At that point, the results immediately become noticeably sharper in an abrupt manner, resulting in a "pop."

Figure 6A:
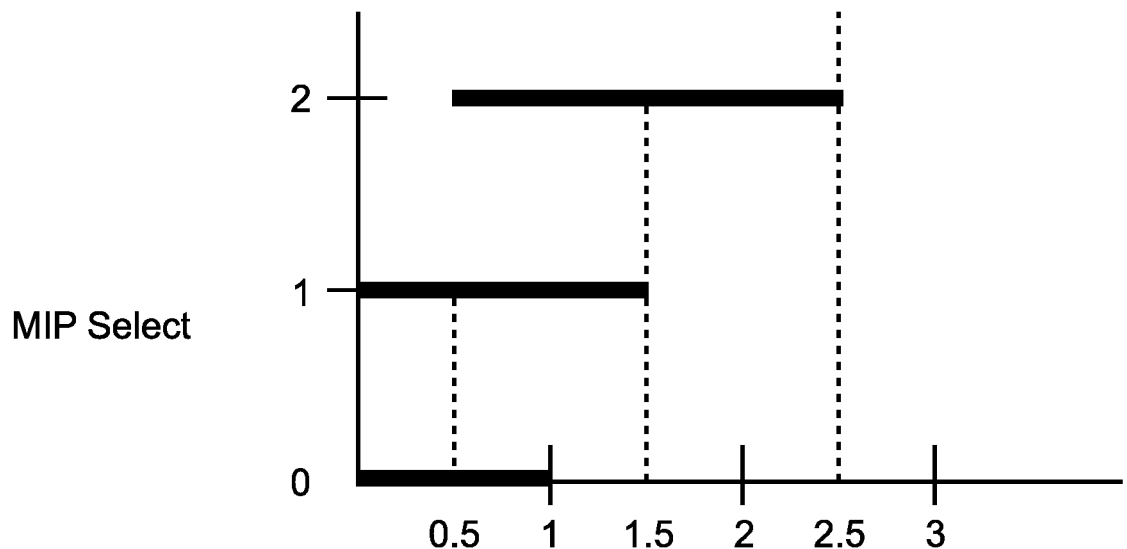
FIG. 6A illustrates a sequence for selecting mipmaps used with non-linear filtering, in accordance with an example.
Figure 6B:
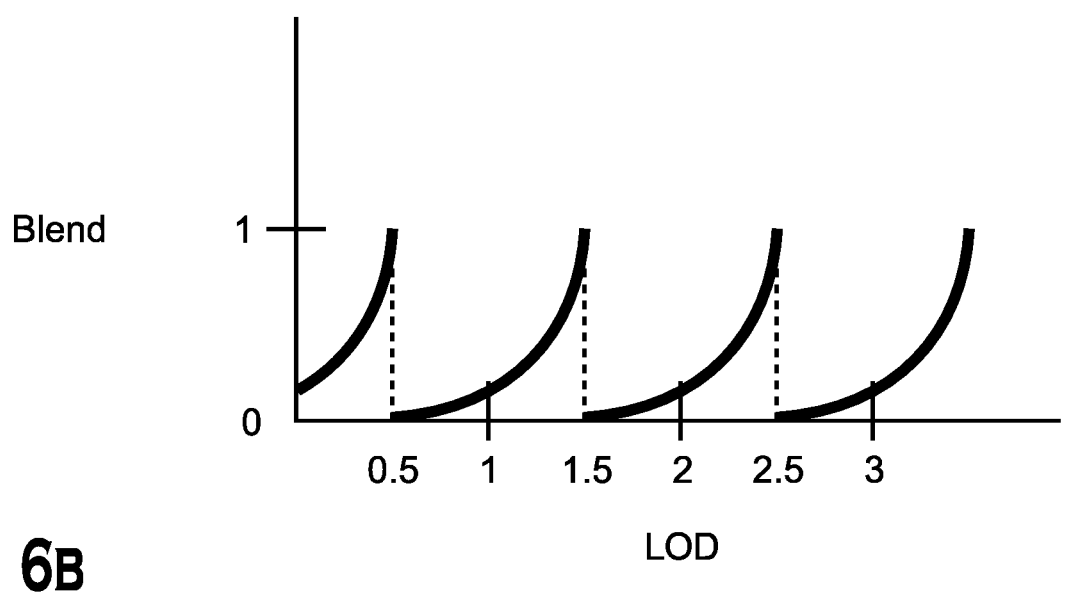
FIG. 6B illustrates the relationship between the blend factor and the LOD in non-linear filtering, in accordance with an example.

FIGS. 6A and 6B illustrate an alternative to trilinear filtering, which provides smoother level of detail transitions by applying non-linear filtering when transitioning from a lower-resolution mipmap to a higher-resolution mipmap as well as a bias that delays use of higher resolution MIP levels while such levels are being loaded. The proposed solution eliminates some of the texture content popping artifacts that occur with trilinear filtering, thus enhancing the experience. FIG. 6A illustrates a sequence for selecting mipmaps used with the non-linear filtering example. As was the case with FIG. 5A, in FIG. 6A the x-axis corresponds to the LOD value, and resolution increases as the LOD approaches zero.

In the example of FIG. 6A, when the LOD is decreasing and reaches a value equal to 1.5, the mipmap corresponding to level 1 is selected. When the LOD further decreases to 0.5, the mipmap corresponding to level 0 is selected. Thus, in contrast to the standard trilinear filtering shown in FIG. 5A, selection of the next higher-level mipmap is delayed by a bias.

In the case of the standard trilinear filtering in FIG. 5A, selecting of the mipmap corresponding to level 1 occurs when the LOD decreases to 2.0, whereas in the non-linear filtering shown in FIG. 6A, selecting of same mipmap is delayed until the LOD value decreases to 1.5. While in FIG. 6A, the selection of the next higher resolution mipmap is delayed by an amount equivalent to 0.5 LOD as compared to that used in the standard trilateral filtering, other offset amounts are also within the scope of this disclosure.

FIG. 6B illustrates that, as compared to standard trilinear filtering, initiation of each transition is delayed by an offset (or bias), which corresponds to the time selection of the next higher resolution mipmap was delayed in FIG. 6A. In one example, this offset or bias serves to delay the initial use of the next higher resolution mipmap until it has been loaded. Thus, whereas in FIG. 5B, the system transitions from interpolating between MIP levels 2 and 3, to interpolating between MIP levels 1 and 2 when the LOD reaches 2, in FIG. 6B the system delays the corresponding transition until the LOD reaches 1.5. More specifically, in FIG. 6B, when the LOD is decreasing from 2.5 to 1.5, the system interpolates between MIP levels 2 and 3 using a blend rate that decreases according to a curved trajectory. Then, when the LOD reaches 1.5, the system transitions from interpolating between MIP levels 2 and 3, to interpolating between MIP levels 1 and 2. When the LOD reaches 1.5, a blend rate of 1 is used for the interpolation, indicating that at that point the relative contributions from MIP levels 1 and 2 are 0% and 100%, respectively. As the LOD decreases from 1.5 to 0.5, the system interpolates between MIP levels 1 and 2 using a blend rate that decreases according to the curved trajectory. Next, when the LOD reaches 0.5, the system transitions from interpolating between MIP levels 1 and 2, to interpolating between MIP levels 0 and 1. When the LOD reaches 0.5, a blend rate of 1 is used for the interpolation, indicating that at that point the relative contributions from MIP levels 0 and 1 are 0% and 100%, respectively. As the LOD decreases from 0.5 to 0.0, the system interpolates between MIP levels 0 and 1 using a blend rate that decreases according to the curved trajectory.

It should be understood that in the technique of FIGS. 6A-6B, there is a difference between the time at which a MIP level is loaded and the time at which a MIP level is selected in the filter. Specifically, the time at which a MIP level is loaded is specified according to FIG. 5A, while the time at which the MIP level is selected is specified according to FIG. 6A. Put differently, as the LOD transitions from higher to lower, a MIP level loader (e.g., the texture fetch unit 250) loads new MIP levels as needed. When the LOD arrives at a point where a new MIP level is needed to be loaded, according to FIG. 5A, the texture fetch unit 250 loads that new MIP level so that the new MIP level is available. Since this loading takes some time, there is a period of time between the point at which the MIP level is requested to be loaded and the point at which the MIP level is actually selected (according to FIG. 6A) where the MIP level can be loaded in to the local memory for use. This period of time acts as a sort of automatic pre-fetching for MIP levels as new MIP levels are needed.

In an example, the LOD is at 1.4 in one frame. At this point in time, MIP levels 1 and 2 are currently loaded in local memory, since, as indicated in FIG. 5A, MIP level 1 was loaded when LOD reached a value of 2.0. In addition, MIP levels 1 and 2 are selected for filtering, according to FIG. 6A. When the LOD value drops below LOD 1.0, the texture fetch unit 250 loads MIP level 0, as indicated by FIG. 5A. When LOD drops below 0.5, the texture fetch unit 250 selects MIP levels 0 and 1 for filtering. At this point, MIP level 0 is already loaded, as described above. As can be seen, the bias towards a lower LOD used for selecting a lower MIP level provides time to load that MIP level as compared with trilinear filtering.

Figure 6C:
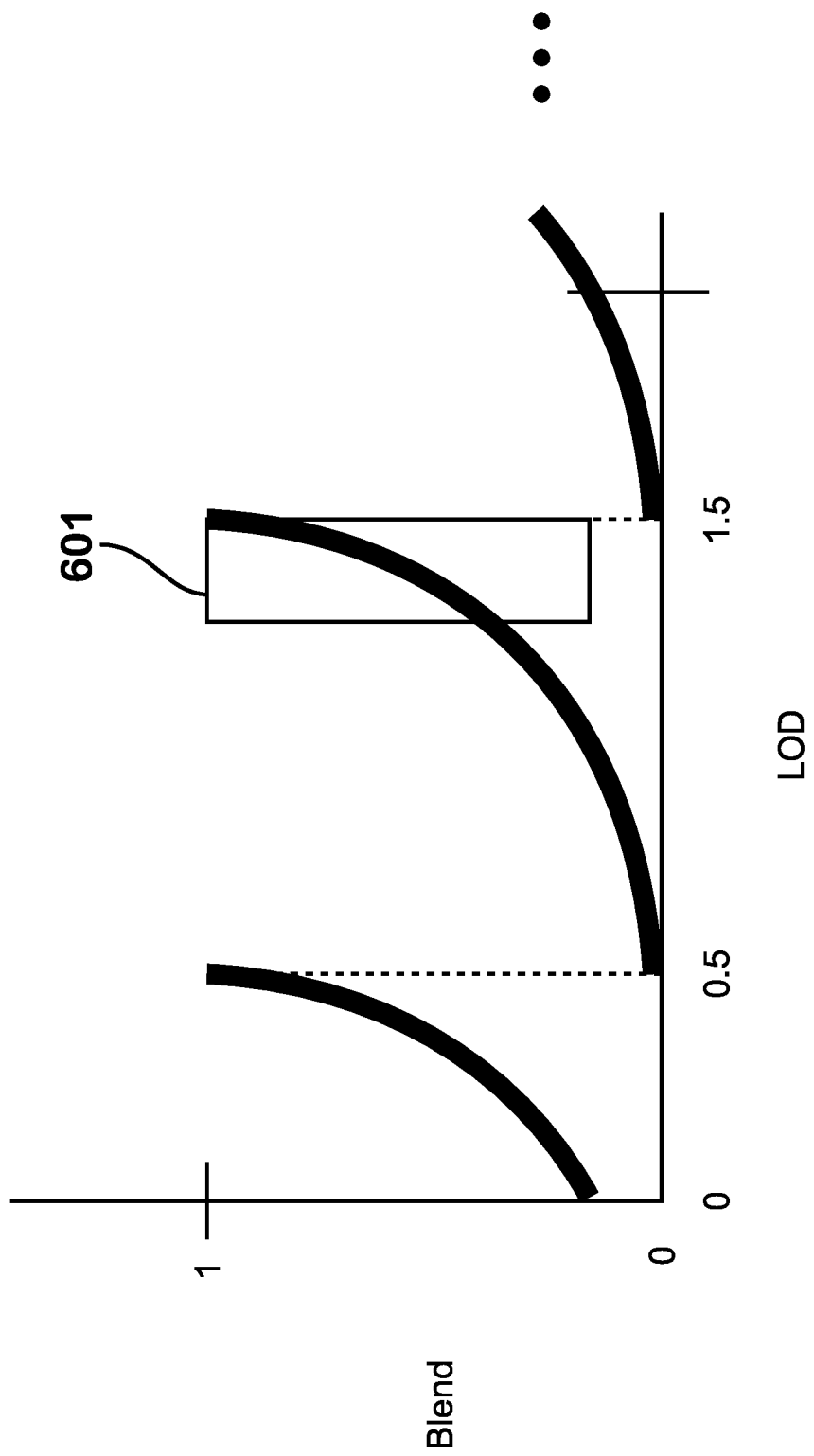
FIG. 6C is an expanded version of a portion of FIG. 6B which illustrates the initial biasing of the blend factor in favor of the lower resolution mipmap, in accordance with an example.

FIG. 6C shows an expanded portion of the relationship between the blend factor and the LOD from FIG. 6B. Referring to the portion of the interpolation curve in box 601, the nonlinear filter has a slope that is higher than that of the trilinear filter. In the example shown, this higher slope quickly brings the filtering weights to a blend value that is more similar to a result that would occur with no bias and with standard trilinear filtering. This high slope thus compensates for the reduction in filter resolution that is introduced by the bias. In other words, the technique shown in FIGS. 6A-6C (with the loading of FIG. 5A) biases texture level of detail selection to delay transition to a higher-resolution mipmap and compensates for loss of sharpness by changing the shape of the filter. Delaying transition to the next MIP level allows the streaming system more time to bring new MIP content into memory. This allow better equalization of texture loads over time, reducing the prevalence of bursty loads that result in popping artifacts.

In accordance with a further aspect, the mode of operation shown in FIGS. 6A-6C can be altered based on operating conditions. In an example, when operating under heavy memory pressure (e.g., a high amount of memory traffic and low amount of available memory bandwidth), the texture mapping unit 250 biases the texture level of detail and compensates for that bias as shown in FIGS. 6A-6C. Once the memory pressure is alleviated, both the bias and the shape of the filtering could gradually back off to a regular or standard operation (e.g., a normal trilinear filter). In one embodiment, a feedback mechanism adjusts the bias level and filter shape dynamically based on operating conditions, and influences the texture residency estimation to match the filter operation. Continuously varying the filter operation over time in response and in coordination with streaming will reduce the visual artifacts.

Figure 7:
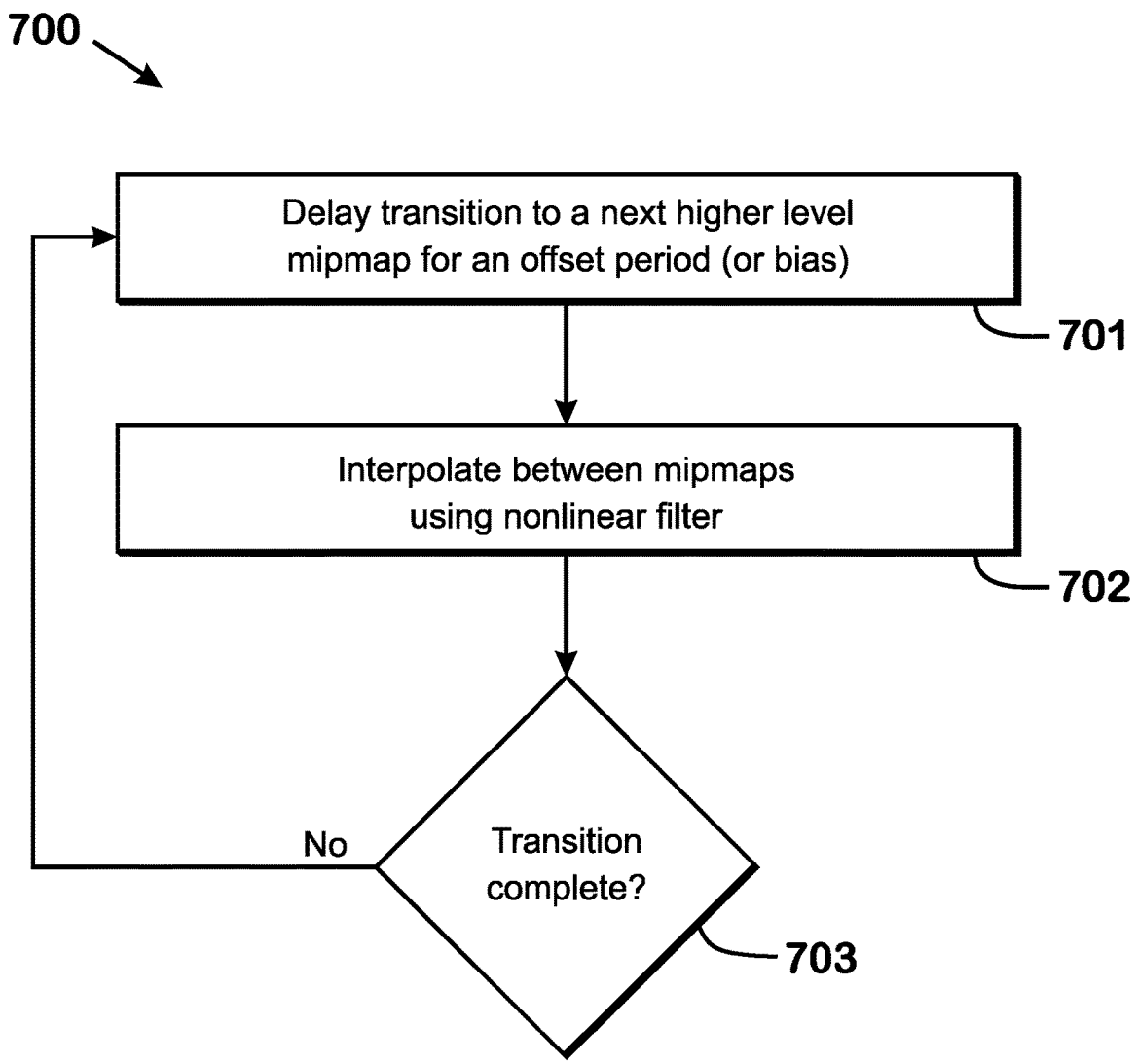
FIG. 7 is a flow diagram of a method for texture filtering, according to an example.

FIG. 7 is a flow diagram of a method for texture filtering, according to an example. In the example, transitioning occurs between a first mipmap corresponding to a first texture resolution and a second mipmap corresponding to a second texture resolution, wherein the first texture resolution is lower than the second texture resolution. In step 701, initiation of the transitioning is delayed by an offset period or bias that delays initial use of the second mipmap as compared to a trilinear filter. In step 702, transitioning between the first and second mipmaps occurs. Here, the method interpolates between the first mipmap and the second mipmap by applying weightings selected from a nonlinear filter. During an initial portion of the transitioning (step 702), the nonlinear filter has a slope that is higher than a slope for trilinear filtering. The process continues until the transition between mipmaps is complete in step 703.

In some examples, as a level of detail (LOD) transitions from higher to lower, a new MIP level is loaded into a memory that makes the new MIP level immediately available for texture filtering. For example, the loading loads the new MIP level from a higher-level cache, system memory, or a non-volatile memory into a low level cache.

In some examples, there is a time period between when the new MIP level is requested to be loaded into the memory and when the new MIP level is selected for interpolation. In some embodiments, this time period results in automatic pre-fetching for MIP levels as new MIP levels are needed. In some examples, the time period corresponds to a fractional value of an LOD.

In one example, the nonlinear filter has a quadratic shape. In some embodiments, the bias and shape of the nonlinear filter are dynamically adjusted based on one or more operating conditions. In some examples, performance of the method results in a reduction of visual artifacts as compared to trilinear filtering.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for texture filtering, comprising:
   transitioning from a first mipmap corresponding to a first texture resolution to a second mipmap corresponding to a second texture resolution higher than the first texture resolution;
   wherein initiation of the transitioning is delayed by applying a bias to a level of detail factor calculated for a trilinear filter to obtain an adjusted level of detail, wherein the bias delays initial use of the second mipmap as compared to the trilinear filter, and the bias is dependent on loading status of the second mipmap into memory;
   selecting first and second weightings with a nonlinear filter based on the adjusted level of detail; and interpolating between the first mipmap and the second mipmap by applying the first weighting to texels from the first mipmap and the second weighting to texels from the second mipmap.

2. The method of claim 1, wherein the nonlinear filter has a quadratic shape.

3. The method of claim 1, wherein the bias and shape of the nonlinear filter are dynamically adjusted based on one or more operating conditions.

4. The method of claim 1, wherein as a level of detail (LOD) transitions from higher to lower, loading a new MIP level into a memory that makes the new MIP level immediately available for texture filtering.

5. The method of claim 4, wherein there is a time period between when the new MIP level is requested to be loaded into the memory and when the new MIP level is selected for interpolation.

6. The method of claim 5, wherein the time period results in automatic pre-fetching for MIP levels as new MIP levels are needed.

7. The method of claim 6, wherein the time period corresponds to a fractional value of an LOD.

8. The method of claim 1, wherein performance of the method results in a reduction of visual artifacts as compared to trilinear filtering.

9. The method of claim 4, wherein the loading loads from a higher-level cache, system memory, or a non-volatile memory into a low-level cache.

10. A system for texture filtering, comprising:
a memory configured to store a first mipmap corresponding to a first texture resolution and a second mipmap corresponding to a second texture resolution higher than the first texture resolution; and
a processor configured to perform operations including:
transitioning from the first mipmap to the second mipmap; wherein initiation of the transitioning is delayed by applying a bias to a level of detail factor calculated for a trilinear filter to obtain an adjusted level of detail, wherein the bias delays initial use of the second mipmap as compared to the trilinear filter, and the bias is dependent on loading status of the second mipmap into memory;
selecting first and second weightings with a nonlinear filter based on the adjusted level of detail; and
interpolating between the first mipmap and the second mipmap by applying the first weighting to texels from the first mipmap and the second weighting to texels from the second mipmap.

11. The system of claim 10, wherein the nonlinear filter has a quadratic shape.

12. The system of claim 10, wherein the processor dynamically adjusts the bias and shape of the nonlinear filter are based on one or more operating conditions.

13. The system, of claim 10, wherein as a level of detail (LOD) transitions from higher to lower, the processor loads a new MIP level into the memory whereby the new MIP level immediately available for texture filtering.

14. The system of claim 13, wherein there is a time period between when the new MIP level is requested to be loaded into the memory and when the new MIP level is selected for interpolation.

15. The system of claim 14, wherein the time period results in automatic pre-fetching for MIP levels as new MIP levels are needed.

16. The system of claim 15, wherein the time period corresponds to a fractional value of an LOD.

17. The system of claim 10, wherein operation of the system results in a reduction of visual artifacts as compared to trilinear filtering.

18. The system of claim 13, wherein the memory corresponds to a low-level cache, and the processor loads from a higher-level cache, system memory, or a non-volatile memory into the low level cache.

19. The system of claim 18, wherein the low-level cache is a level 0 cache.

20. A non-transitory computer-readable medium storing instructions that, when executed by a processor, cause the processor to perform operations comprising:
transitioning from a first mipmap corresponding to a first texture resolution to a second mipmap corresponding to a second texture resolution higher than the first texture resolution;
wherein initiation of the transitioning is delayed by applying a bias to a level of detail factor calculated for a trilinear filter to obtain an adjusted level of detail, wherein the bias delays initial use of the second mipmap as compared to a trilinear filter, and the bias is dependent on loading status of the second mipmap into memory;
selecting first and second weightings with a nonlinear filter based on the adjusted level of detail; and
interpolating between the first mipmap and the second mipmap by applying the first weighting to texels from the first mipmap and the second weighting to texels from the second mipmap.

* * * * *